(12) United States Patent
Matsumoto (10) Patent No.: US 12,095,380 B2
(45) Date of Patent: Sep. 17, 2024

(54) INTEGRATED CIRCUIT AND POWER SUPPLY CIRCUIT

(71) Applicant: FUJI ELECTRIC CO., LTD., Kawasaki (JP)

(72) Inventor: Shinji Matsumoto, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/972,354

(22) Filed: Oct. 24, 2022

(65) Prior Publication Data

US 2023/0188050 A1 Jun. 15, 2023

(30) Foreign Application Priority Data

Dec. 15, 2021 (JP) .................................. 2021-203097

(51) Int. Cl.
*H02M 3/338* (2006.01)
*H02M 3/335* (2006.01)
*H02M 1/36* (2007.01)

(52) U.S. Cl.
CPC ..... *H02M 3/3385* (2013.01); *H02M 3/33507* (2013.01); *H02M 1/36* (2013.01)

(58) Field of Classification Search
CPC .................................................. H02M 3/3385
USPC ......................................................... 307/31
See application file for complete search history.

(56) References Cited

U.S. PATENT DOCUMENTS

| 11,742,763 B2 * | 8/2023 | Matsumoto ............. H02M 1/08 363/21.02 |
| 2008/0259659 A1 * | 10/2008 | Choi ....................... H02M 1/32 363/50 |
| 2014/0043869 A1 | 2/2014 | Hirabayashi | |
| 2014/0203726 A1 | 7/2014 | Katsura | |
| 2016/0241144 A1 | 8/2016 | Onodera et al. | |
| 2017/0201181 A1 | 7/2017 | Yabuzaki | |

FOREIGN PATENT DOCUMENTS

| JP | 2011-045216 A | 3/2011 |
| JP | 2014-036555 A | 2/2014 |
| JP | 2014-143235 A | 8/2014 |
| JP | 2016-149867 A | 8/2016 |
| JP | 2017-127109 A | 7/2017 |

* cited by examiner

*Primary Examiner* — Joseph Chang
(74) *Attorney, Agent, or Firm* — Rabin & Berdo, P.C.

(57) ABSTRACT

An integrated circuit for a power supply circuit including a transistor configured to control a current flowing through a coil. The integrated circuit is configured to drive the transistor. The integrated circuit includes: a determination circuit configured to determine whether a predetermined time period has elapsed since a power supply voltage of the integrated circuit rises to a first predetermined level; an oscillator circuit configured to output an oscillator signal, which has a first frequency before lapse of the predetermined period, and changes in a range at least from the first frequency to a second frequency higher than the first frequency after the lapse of the predetermined time period; and a driver circuit configured to switch the transistor responsive to the oscillator signal during and after the predetermined time period, the switching causing an on period of the transistor to gradually increase in the predetermined time period.

7 Claims, 9 Drawing Sheets

| Vfba | Vfbb | Vfbc | Vfbd |
|---|---|---|---|
| V1=VREF3 | V1=VREF1 | V3=VREF1 | V3=VREF2 |

| Vfba | Vfbb | Vfbc | Vfbd |
|---|---|---|---|
| V1=VREF3 | V1=VREF1 | V3,V4=VREF1 | V4=VREF1 |

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2021-203097 filed on Dec. 15, 2021, the entire disclosure of which is hereby incorporated by reference herein.

BACKGROUND

Technical Field

The present disclosure relates to an integrated circuit and a power supply circuit.

Description of the Related Art

Some of integrated circuits controlling a power supply circuit perform so-called soft start such that the on period of a transistor in the power supply circuit gradually increases during startup.

In addition, some of the integrated circuits increase the switching frequency of the transistor in the soft start period (for example, Japanese Patent Application Publication Nos. 2011-045216, 2014-036555, 2014-143235, 2016-149867, and 2017-127109).

In general, it is known that, if the switching frequency of the transistor is high, a switching loss increases, thereby increasing noise. Further, since a load does not operate in the soft start period, it may be unnecessary to increase the switching frequency to rapidly raise an output voltage. Moreover, switching the transistor while the generated noise is large may adversely affect the transistor.

SUMMARY

A first aspect of an embodiment of the present disclosure is an integrated circuit for a power supply circuit configured to generate an output voltage of a target level from an input voltage thereof, the power supply circuit including a coil and a transistor configured to control a current flowing through the coil, the integrated circuit being configured to drive the transistor, the integrated circuit comprising: a determination circuit configured to determine whether a predetermined time period has elapsed since a power supply voltage of the integrated circuit rises to a first predetermined level; an oscillator circuit configured to output an oscillator signal, the oscillator signal having a first frequency before lapse of the predetermined period, and changing in a range at least from the first frequency to a second frequency higher than the first frequency, based on the output voltage, after the lapse of the predetermined time period; and a driver circuit configured to switch the transistor responsive to the oscillator signal, so as to gradually increase an on period of the transistor, in the predetermined time period, and switch the transistor responsive to the oscillator signal, after the lapse of the predetermined time period.

A second aspect of an embodiment of the present disclosure is an integrated circuit for a power supply circuit configured to generate an output voltage of a target level from an input voltage thereof, the power supply circuit including a coil and a transistor configured to control a current flowing through the coil, the integrated circuit being configured to drive the transistor, the integrated circuit comprising: a determination circuit configured to determine whether a predetermined time period has elapsed since a power supply voltage of the integrated circuit rises to a first predetermined level; an oscillator circuit configured to output an oscillator signal, the oscillator signal having a first frequency, a second frequency higher than the first frequency, and a third frequency lower than the first frequency, changing in a first range from the first frequency to the third frequency based on the output voltage, before lapse of the predetermined time period, and changing in a second range from the third frequency to the second frequency based on the output voltage, after the lapse of the predetermined time period; and a driver circuit configured to switch the transistor responsive to the oscillator signal that changes in the first range, in the predetermined time period, and switch the transistor responsive to the oscillator signal that changes in the second range, after the lapse of the predetermined time period.

A third aspect of an embodiment of the present disclosure is a power supply circuit configured to generate an output voltage of a target level from an input voltage thereof, the power supply circuit comprising: a coil; a transistor configured to control a current flowing through the coil; and an integrated circuit configured to drive the transistor, the integrated circuit including a determination circuit configured to determine whether a predetermined time period has elapsed since a power supply voltage of the integrated circuit rises to a first predetermined level, an oscillator circuit configured to output an oscillator signal, the oscillator signal having a first frequency, before lapse of the predetermined time period, and changing in a range at least from the first frequency to a second frequency higher than the first frequency, based on the output voltage, after the lapse of the predetermined time period, and a driver circuit configured to switch the transistor responsive to the oscillator signal, so as to gradually increase an on period of the transistor, in the predetermined time period, and switch the transistor responsive to the oscillator signal, after the lapse of the predetermined time period.

DETAILED DESCRIPTION

At least following matters will become apparent from the descriptions of the present specification and the accompanying drawings.

Embodiments

Figure 1:
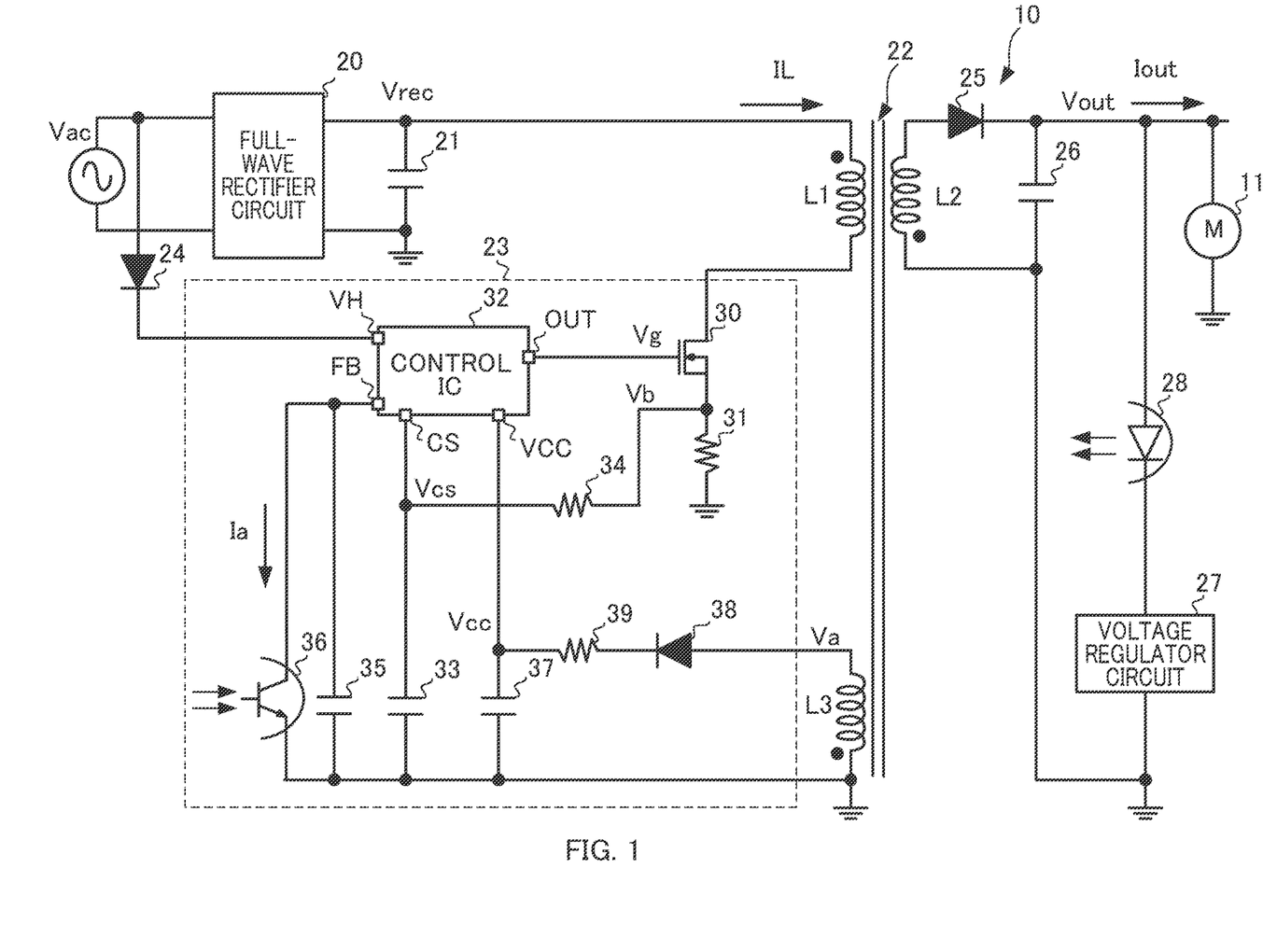
FIG. 1 is a diagram illustrating a configuration example of an AC-DC converter 10.

FIG. 1 is a diagram illustrating a configuration example of an AC-DC converter 10 which is an embodiment of the present disclosure. The AC-DC converter 10 is a flyback power supply circuit that generates an output voltage Vout of a target level from an input voltage thereof which is an alternating-current (AC) voltage Vac of a commercial power supply. The AC-DC converter 10 supplies power to a motor 11. In addition, the AC-DC converter 10 supplies an output current Iout to the motor 11.

<<<Overview of AC-DC Converter 10>>>

The AC-DC converter 10 includes a full-wave rectifier circuit 20, capacitors 21 and 26, a transformer 22, a control block 23, diodes 24 and 25, a voltage regulator circuit 27, and a light-emitting diode 28.

The full-wave rectifier circuit 20 full-wave rectifies a predetermined AC voltage Vac inputted thereto and outputs a resultant voltage, as a voltage Vrec, to a primary coil L1 of the transformer 22 and the capacitor 21. The capacitor 21 smooths the voltage Vrec. Note that the AC voltage Vac is, for example, a voltage at an effective value in a range of 100 to 240 V and a frequency in a range of 50 to 60 Hz.

The transformer 22 includes the primary coil L1, and a secondary coil L2 and an auxiliary coil L3 that are magnetically coupled to the primary coil L1. The secondary coil L2 and the auxiliary coil L3 are wound such that voltages generated across the secondary coil L2 and the auxiliary coil L3 have a polarity opposite to a voltage generated across the primary coil L1.

The control block 23 controls an inductor current IL flowing through the primary coil L1 on a primary side of the transformer 22, to thereby control the voltage generated across the secondary coil L2 on a secondary side of the transformer 22. As a result, the output voltage Vout of the target level is generated on the secondary side of the transformer 22.

The diode 24 half-wave rectifies the AC voltage Vac. Note that a voltage from the diode 24 is applied to a terminal VH of a control IC 32 (described later) included in the control block 23.

The diode 25 rectifies the current from the secondary coil L2 of the transformer 22, to supply a resultant current to the capacitor 26. Since the capacitor 26 is charged with the current from the diode 25, the output voltage Vout is generated between terminals of the capacitor 26.

The voltage regulator circuit 27 generates a constant direct-current (DC) voltage, and is configured using a shunt regulator, for example.

The light-emitting diode 28 is an element that emits light with an intensity corresponding to a difference between the output voltage Vout and an output of the voltage regulator circuit 27, and configures a photocoupler together with a phototransistor 36 which will be described later. In an embodiment of the present disclosure, the intensity of the light from the light-emitting diode 28 increases as the level of the output voltage Vout rises.

<<<Overview of Control Block 23>>>

The control block 23 is a circuit block to control the AC-DC converter 10. The control block 23 includes a power transistor 30, resistors 31, 34, and 39, the control IC 32, capacitors 33, 37, and 35, the phototransistor 36, and a diode 38.

The power transistor 30 is an NMOS transistor to control power supplied to the motor 11. In an embodiment of the present disclosure, the power transistor 30 is a metal oxide semiconductor (MOS) transistor; however, it is not limited thereto. As long as it is a transistor capable of controlling power, the power transistor 30 may be a bipolar transistor or the like, for example.

The resistor 31 detects the inductor current IL flowing through the primary coil L1 when the power transistor 30 is on, and has one end coupled to the source electrode of the power transistor 30 and the other end grounded.

The control IC 32 is an integrated circuit (IC) to control switching of the power transistor 30 such that the level of the output voltage Vout reaches the target level. Specifically, the control IC 32 drives the power transistor 30 based on the inductor current IL and the output voltage Vout.

The control IC 32 has terminals CS, FB, OUT, VCC, and VH, and the details thereof will be described later. The gate electrode of the power transistor 30 is coupled to the terminal OUT. Although the actual control IC 32 has terminals other than the above, they are omitted for explanatory convenience.

The capacitor 33 is provided between the terminal CS and the ground, and receives, through the resistor 34, the voltage across the resistor 31 that is generated with the inductor current IL flowing. Note that the capacitor 33 and the resistor 34 configure a low-pass filter to stabilize a voltage Vcs at the terminal CS.

The capacitor 37 is provided between the terminal VCC and the ground. The diode 38 has an anode coupled to the auxiliary coil L3 and a cathode coupled to the terminal VCC through the resistor 39. A voltage Va generated at the auxiliary coil L3 is applied to the capacitor 37 through the diode 38 and the resistor 39, and the voltage across the capacitor 37 results in a power supply voltage Vcc of the control IC 32.

The capacitor 35 is provided between the terminal FB and the ground, to stabilize a voltage Vfb at the terminal FB. The voltage Vfb is a feedback voltage corresponding to the output voltage Vout, and is applied to the terminal FB. Note that the control IC 32 turns on the power transistor 30 at a frequency corresponding to the voltage Vfb, which will be described later in detail. Usually, when the voltage Vcs exceeds a voltage Vfb_div (described later) obtained by dividing the voltage Vfb while the power transistor 30 is turned on, the control IC 32 turns off the power transistor 30.

The phototransistor 36 is provided between the terminal FB and the ground, and configures the photocoupler together with the light-emitting diode 28 on the secondary side of the transformer 22. In response to an increase in the intensity of the light emitted by the light-emitting diode 28, the phototransistor 36 passes a greater sink current Ia to the terminal FB.

<<<Configuration of Control IC 32>>>

Figure 2:
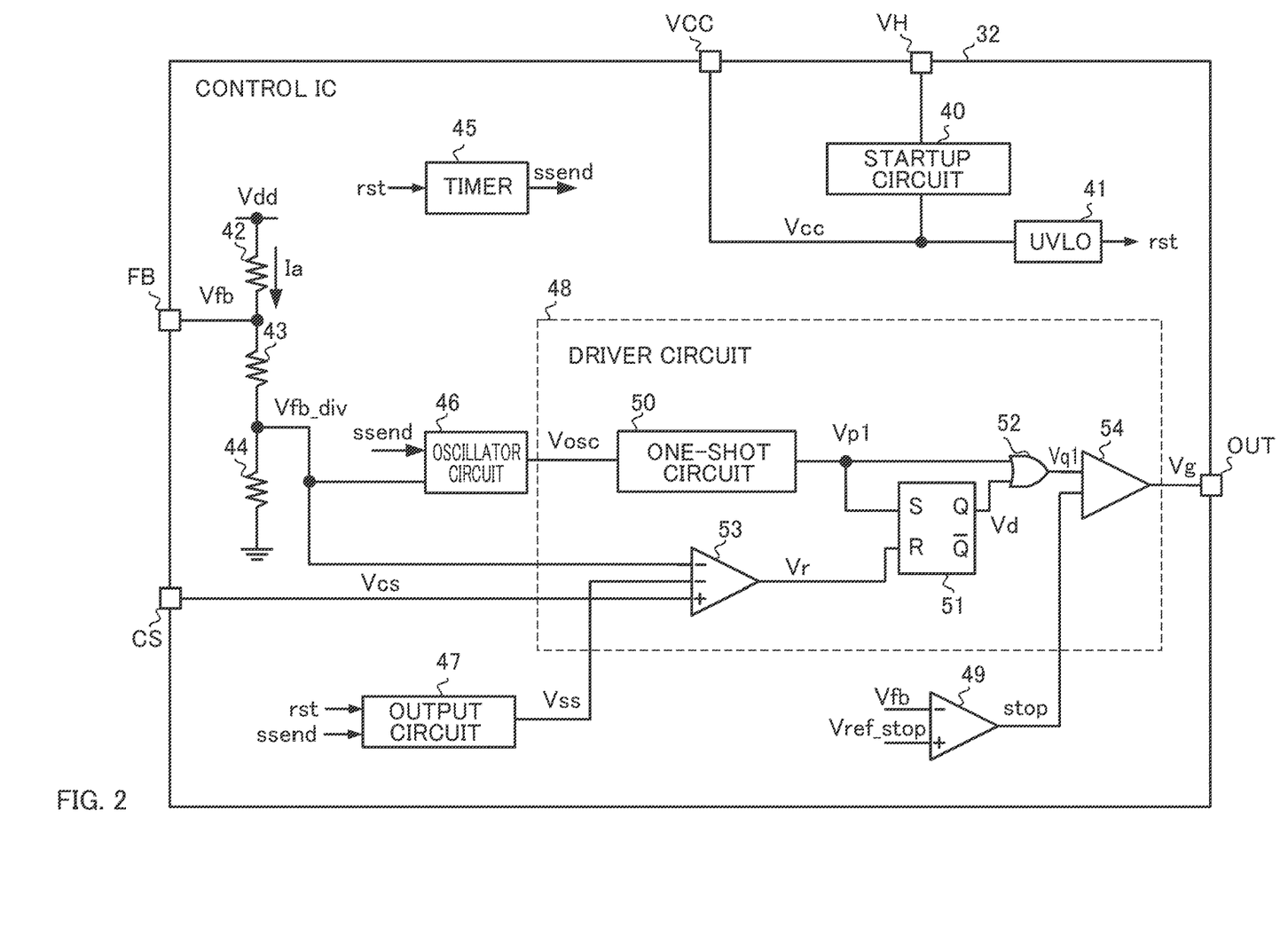
FIG. 2 is a diagram illustrating a configuration example of a control IC 32.

FIG. 2 is a diagram illustrating a configuration example of the control IC 32. The control IC 32 includes a startup circuit 40, an undervoltage lockout circuit (UVLO) 41, resistors 42 to 44, a timer 45, an oscillator circuit 46, an output circuit 47, a driver circuit 48, and a comparator 49.

==Startup Circuit 40==

When the AC-DC converter 10 is started up, the startup circuit 40 charges the capacitor 37 of FIG. 1 with a voltage at the terminal VH, to thereby generate the power supply voltage Vcc.

The startup circuit 40 is turned on, in response to the AC voltage Vac being applied to the AC-DC converter 10 and the power supply voltage Vcc being lower than a predetermined level Vccoff, and stops operating in response to the power supply voltage Vcc reaching the predetermined level Vccoff.

==Undervoltage Lockout Circuit (UVLO) 41==

The undervoltage lockout circuit 41 resets the control IC 32 in response to the power supply voltage Vcc being lower than a predetermined level. Specifically, in response to the power supply voltage Vcc dropping below a predetermined level Vccuvlo, the undervoltage lockout circuit 41 outputs a signal rst to reset the control IC 32. On the other hand, in response to the power supply voltage Vcc being equal to or higher than the predetermined level Vccuvlo, the undervoltage lockout circuit 41 outputs the signal rst to release the reset of the control IC.

==Resistors 42 to 44==

The resistor 42 is provided between a node that receives an internal voltage Vdd generated from the power supply voltage Vcc by an internal power supply (not illustrated) and the terminal FB, and generates the voltage Vfb corresponding to the sink current Ia passed by the phototransistor 36. The resistors 43 and 44 configure a voltage divider circuit that divide the voltage Vfb. The voltage Vfb_div is generated at a coupling point at which the resistors 43 and 44 are coupled.

==Timer 45==

The timer 45 determines whether a soft start period (hereinafter, referred to as "predetermined period P") has elapsed since receipt of the signal rst to release the reset of the control IC 32. Specifically, the timer 45 determines whether the predetermined period P has elapsed since the power supply voltage Vcc has risen to the predetermined level Vccuvlo and the undervoltage lockout circuit 41 outputs the signal rst to release the reset of the control IC 32. In addition, before a lapse of the predetermined period P (i.e., in the soft start period), the timer 45 outputs a signal ssend at a low level (hereinafter, referred to as low or low level) to the oscillator circuit 46. On the other hand, after the lapse of the predetermined period P (hereinafter, in a "normal period"), the timer 45 outputs the signal ssend at a high level (hereinafter, referred to as high or high level) to the oscillator circuit 46. Note that, the timer 45 corresponds to a "determination circuit", and the predetermined level Vccuvlo corresponds to a "first predetermined level".

==Oscillator Circuit 46==

The oscillator circuit 46 outputs an oscillator signal Vosc with the oscillation frequency Fsw, based on whether it is in the soft start period. Specifically, before the lapse of the predetermined period P, the oscillator circuit 46 outputs the oscillator signal Vosc with a frequency equal to or smaller than an oscillation frequency Fsw1. Further, after the lapse of the predetermined period P, the oscillator circuit 46 outputs the oscillator signal Vosc with a frequency changing in a range at least from the oscillation frequency Fsw1 to an oscillation frequency Fsw2 higher than the oscillation frequency Fsw1, based on the output voltage Vout.

In addition, before the lapse of the predetermined period P, the oscillator circuit 46 outputs the oscillator signal Vosc with a frequency changing in a range from the oscillation frequency Fsw1 to an oscillation frequency Fsw0 lower than the oscillation frequency Fsw1, based on the output voltage Vout. Further, after the lapse of the predetermined period P, the oscillator circuit 46 outputs the oscillator signal Vosc with a frequency changing in a range from the oscillation frequency Fsw0 to the oscillation frequency Fsw2 higher than the oscillation frequency Fsw1, based on the output voltage Vout.

<<<Configuration of Oscillator Circuit 46>>>

Figure 3:
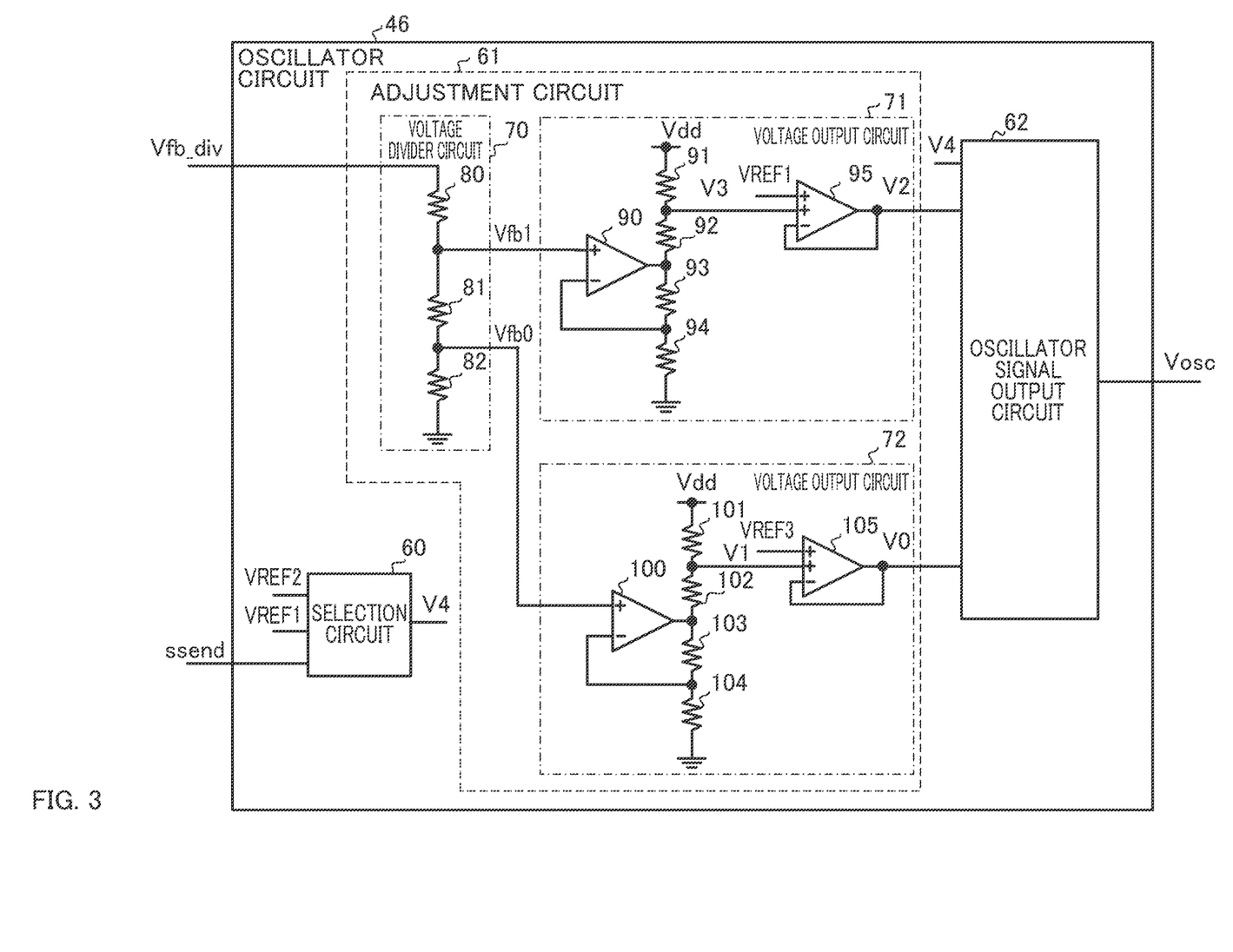
FIG. 3 is a diagram illustrating a configuration example of an oscillator circuit 46.

FIG. 3 is a diagram illustrating a configuration example of the oscillator circuit 46. The oscillator circuit 46 outputs the oscillator signal Vosc with the frequency Fsw corresponding to the voltage Vfb, or the frequency Fsw0 or Fsw1. Specifically, upon receiving the low signal ssend, the oscillator circuit 46 outputs the oscillator signal Vosc with the frequency Fsw0 or Fsw1. On the other hand, upon receiving the high signal ssend, the oscillator circuit 46 outputs the oscillator signal Vosc with the frequency Fsw0 or higher, as well as the frequency from the oscillator frequency Fsw0 to the oscillator frequency Fsw2 based on the voltage Vfb corresponding to a drop in the output voltage Vout.

When the output voltage Vout drops from the target level, the oscillator circuit 46 reduces the oscillation frequency of the oscillator signal Vosc in the soft start period to be lower than the oscillation frequency of the oscillator signal Vosc in the normal period, which will be described later in detail. Accordingly, the control IC 32 reduces switching noise in the soft start period in which the output voltage Vout drops. The oscillator circuit 46 includes a selection circuit 60, an adjustment circuit 61, and an oscillator signal output circuit 62.

==Selection Circuit 60==

The selection circuit 60 selects a voltage from different reference voltages, based on whether it is in the soft start period. Specifically, upon receiving the low signal ssend from the timer 45 before the lapse of the predetermined period P, the selection circuit 60 selects, as a voltage V4, a reference voltage VREF1 corresponding to the oscillation frequency Fsw1. On the other hand, upon receiving the high signal ssend from the timer 45 after the lapse of the predetermined period P, the selection circuit 60 selects, as a voltage V4, a reference voltage VREF2 corresponding to the oscillation frequency Fsw2. Note that the reference voltage VREF1 corresponds to a "first voltage", the reference voltage VREF2 corresponds to a "second voltage", and the voltage V4 corresponds to a "selected voltage".

==Adjustment Circuit 61==

Based on the voltage Vfb corresponding to the output voltage Vout, the adjustment circuit 61 outputs a voltage to adjust the frequency of the oscillator signal Vosc. The adjustment circuit 61 includes a voltage divider circuit 70 and voltage output circuits 71 and 72.

====Voltage Divider Circuit 70====

The voltage divider circuit 70 divides the voltage Vfb_div, to thereby generate voltages Vfb0 and Vfb1. Note that the voltage divider circuit 70 divides the voltage Vfb_div such that the voltage Vfb0 is lower than the voltage Vfb1, and outputs resultant voltages.

The voltage divider circuit 70 includes resistors 80 to 82. The voltage divider circuit 70 has one end to receive the voltage Vfb_div and the other end grounded. The resistors 80 to 82 are coupled in series between the one end and the other end. Thus, the voltage divider circuit 70 generates the voltage Vfb1 at a coupling point at which the resistors 80 and 81 are coupled, and generates the voltage Vfb0 at a coupling point at which the resistors 81 and 82 are coupled.

====Voltage Output Circuit 71====

The voltage output circuit 71 outputs a voltage to change the oscillation frequency Fsw of the oscillator signal Vosc from the oscillation frequency Fsw1 to the oscillation frequency Fsw2. Specifically, the voltage output circuit 71 outputs, as the voltage V2, a voltage to increase the frequency of the oscillator signal Vosc out of the reference voltage VREF1 corresponding to the oscillation frequency Fsw1 and a voltage V3 corresponding to the voltage Vfb.

In response to the voltage Vfb changing such that the voltage V3 corresponding to the voltage Vfb1 is lower than the reference voltage VREF1, the voltage output circuit 71 outputs the reference voltage VREF1 as the voltage V2. On the other hand, in response to the voltage Vfb changing such that the voltage V3 exceeds the reference voltage VREF1, the voltage output circuit 71 outputs the voltage V3 as the voltage V2. The voltage output circuit 71 includes operational amplifiers 90 and 95 and resistors 91 to 94.

The operational amplifier 90 and the resistors 91 to 94 output the voltage V3 that rises with a rise in the voltage Vfb1. The operational amplifier 95 outputs, as the voltage V2, a higher voltage out of the voltage V3 and the reference voltage VREF1 that are applied to two non-inverting inputs.

Accordingly, the operational amplifier 95, in other words, the voltage output circuit 71, outputs the reference voltage VREF1 as the voltage V2, until the voltage Vfb1 rises such that the voltage V3 becomes equal to the reference voltage VREF1, and outputs the voltage V3 as the voltage V2 in response to the voltage V3 exceeding the reference voltage VREF1. Note that the voltage output circuit 71 corresponds to a "first voltage output circuit", the voltage V3 corresponds to a "third voltage", and the voltage V2 corresponds to a "first adjustment voltage".

====Voltage Output Circuit 72====

The voltage output circuit 72 outputs a voltage to change the oscillation frequency Fsw of the oscillator signal Vosc from the oscillation frequency Fsw0 to the oscillation frequency Fsw1. Specifically, the voltage output circuit 72 outputs, as a voltage V0, a voltage to increase the frequency of the oscillator signal Vosc out of the reference voltage VREF3 corresponding to the oscillation frequency Fsw0 lower than the oscillation frequency Fsw1 and the voltage V1 corresponding to the voltage Vfb.

In response to the voltage Vfb changing such that the voltage V1 corresponding to the voltage Vfb0 is lower than the reference voltage VREF3, the voltage output circuit 72 outputs the reference voltage VREF3 as the voltage V0. On the other hand, in response to voltage Vfb changing such that the voltage V1 exceeds the reference voltage VREF3, the voltage output circuit 72 outputs the voltage V1 as the voltage V0. The voltage output circuit 72 includes operational amplifiers 100 and 105 and resistors 101 to 104.

Note that the operational amplifier 100 corresponds to the operational amplifier 90, the resistors 101 to 104 correspond to the resistors 91 to 94, and the operational amplifier 105 corresponds to the operational amplifier 95. In addition, the voltage Vfb0 corresponds to the voltage Vfb1, and the voltage V0 corresponds to the voltage V2. Thus, the voltage output circuit 72 operates similarly to the voltage output circuit 71 does. Note that the voltages V0, V2, and V4 correspond to a "voltage to adjust the frequency of the oscillator signal", and the voltage output circuit 72 corresponds to a "second voltage output circuit". In addition, the reference voltage VREF3 corresponds to a "fourth voltage", the voltage V1 corresponds to a "fifth voltage", and the voltage V0 corresponds to a "second adjustment voltage".

====Oscillator Signal Output Circuit 62====

The oscillator signal output circuit 62 changes the oscillation frequency Fsw of the oscillator signal Vosc, based on the inputted voltage, and outputs a resultant signal. Specifically, the oscillator signal output circuit 62 outputs the oscillator signal Vosc, based on a voltage to reduce the frequency of the oscillator signal Vosc (i.e., the lowest voltage) out of the voltages V0 and V2 from the adjustment circuit 61 and the voltage V4 from the selection circuit 60.

<<<Configuration of Oscillator Signal Output Circuit 62>>>

Figure 4:
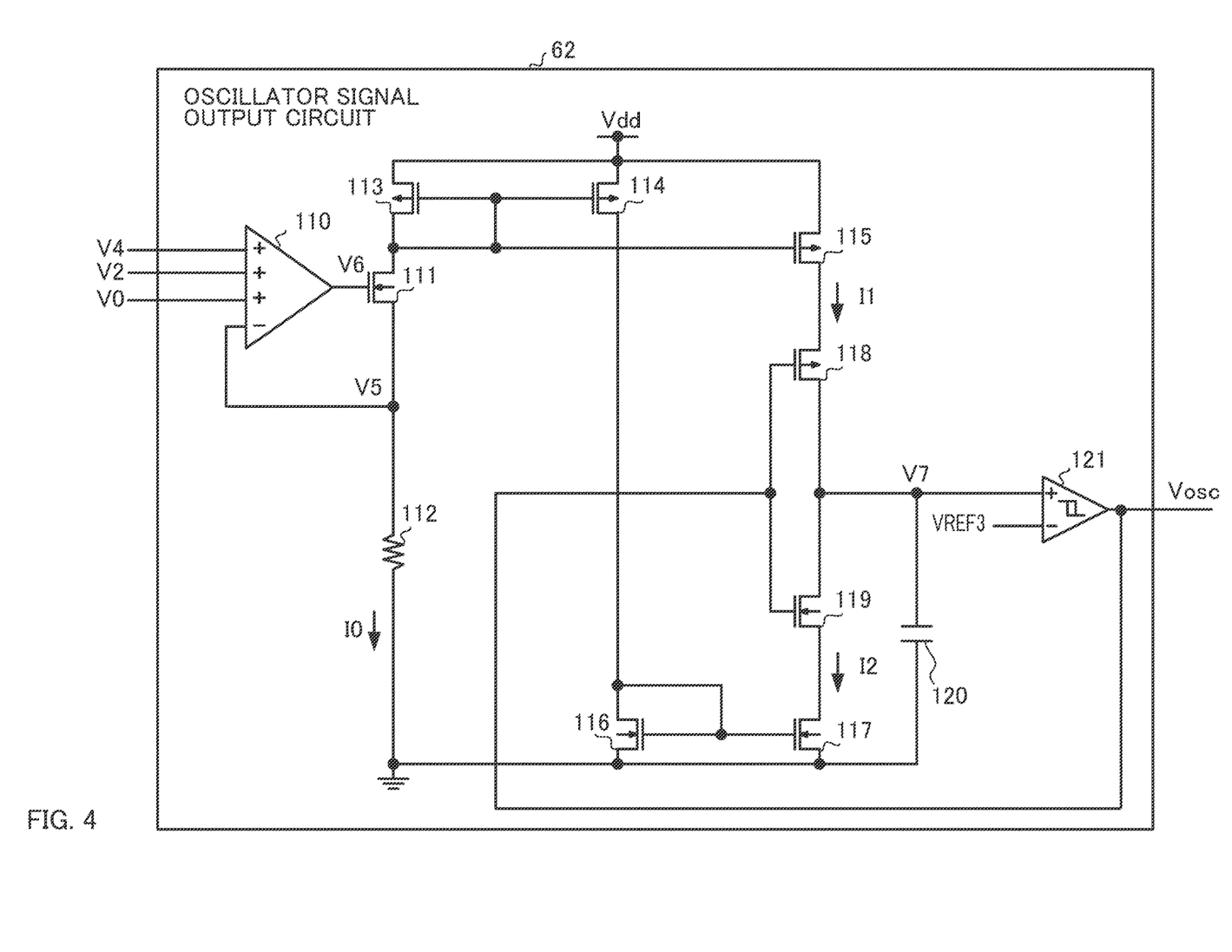
FIG. 4 is a diagram illustrating a configuration example of an oscillator signal output circuit 62.

FIG. 4 is a diagram illustrating a configuration example of the oscillator signal output circuit 62. The oscillator signal output circuit 62 outputs the oscillator signal Vosc with the oscillation frequency Fsw based on the lowest voltage out of the voltages V0, V2, and V4. Note that the reference voltage VREF1 is lower than the reference voltage VREF2, and the reference voltage VREF3 is lower than the reference voltage VREF1.

First, a description will be given of change in the frequency of the oscillator signal Vosc outputted by the oscillator signal output circuit 62 when the signal ssend is high (i.e., in the normal period). Thereafter, a configuration of the oscillator signal output circuit 62 will be described.

Note that, when the signal ssend is low (i.e., in the soft start period), the oscillator signal output circuit 62 outputs the oscillator signal Vosc with the frequency Fsw0 or Fsw1.

Figure 5A:
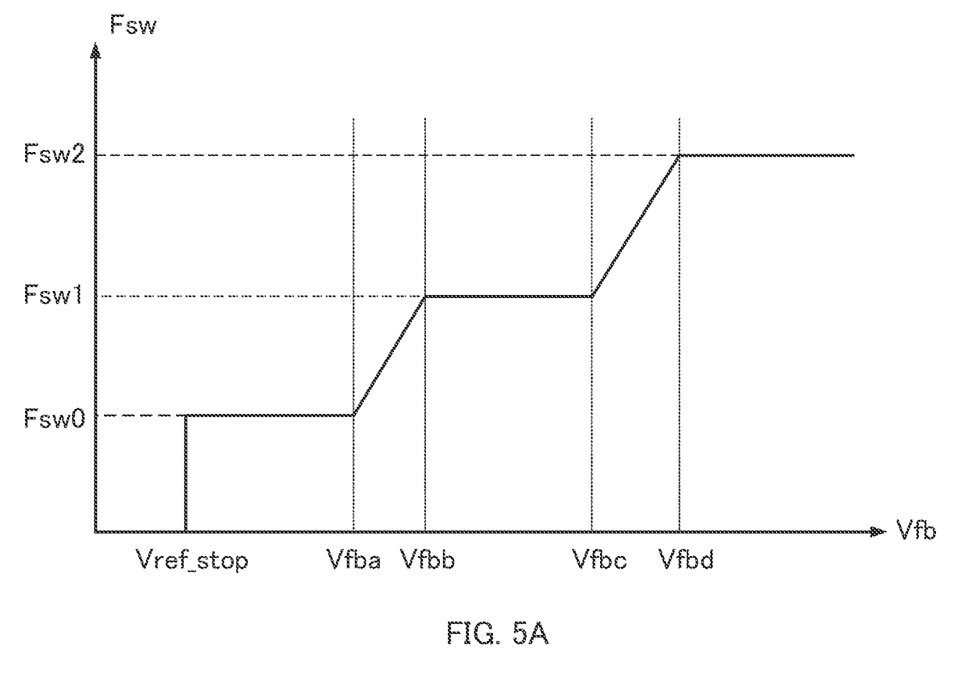
FIG. 5A is a chart illustrating change in frequency Fsw of a driving signal Vg in a normal period.
Figure 5B:
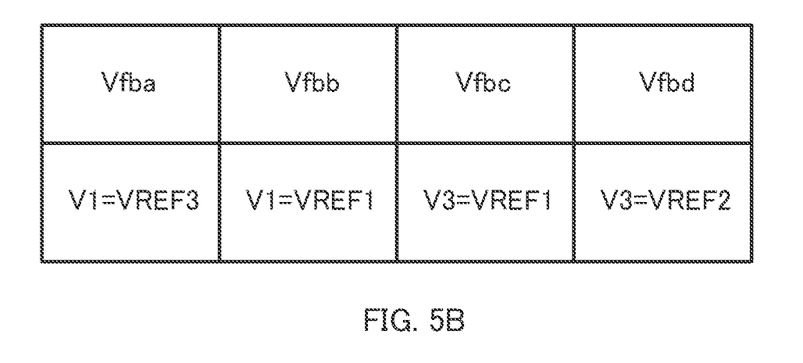
FIG. 5B is a chart illustrating a relationship between voltages V1 and V3 and reference voltages VREF1 to VREF3 when a voltage Vfb reaches voltages Vfba to Vfbd.

As illustrated in FIG. 5A, in response to the voltage Vfb changing such that the voltage V1 corresponding to the voltage Vfb0 is lower than the reference voltage VREF3, the oscillator signal output circuit 62 outputs the oscillator signal Vosc with the frequency Fsw0 that is based on the reference voltage VREF3. On the other hand, in response to the voltage Vfb changing such that the voltage V1 exceeds the reference voltage VREF3, the oscillator signal output circuit 62 outputs the oscillator signal Vosc with the frequency Fsw that is based on the voltage V1 and higher than the frequency Fsw0. It is assumed, as illustrated in FIG. 5B, that the voltage corresponding to the voltage Vfb when the voltage V1 reaches the reference voltage VREF3 is a voltage Vfba.

As illustrated in FIG. 5A, in response to the voltage Vfb changing such that the voltage V1 exceeds the reference voltage VREF1, the oscillator signal output circuit 62 outputs the oscillator signal Vosc with the frequency Fsw1 that is based on the reference voltage VREF1. On the other hand, in response to the voltage Vfb changing such that the voltage V3 exceeds the reference voltage VREF1, the oscillator signal output circuit 62 outputs the oscillator signal Vosc with the frequency Fsw that is based on the voltage V3 and higher than the frequency Fsw1. It is assumed, as illustrated in FIG. 5B, that the voltage corresponding to the voltage Vfb when the voltage V1 reaches the reference voltage VREF1 is the voltage Vfbb, and the voltage corresponding to the voltage Vfb when the voltage V3 reaches the reference voltage VREF1 is a voltage Vfbc.

As illustrated in FIG. 5A, in response to the voltage Vfb changing such that the voltage V3 exceeds the reference voltage VREF2, the oscillator signal output circuit 62 outputs the oscillator signal Vosc with the frequency Fsw2 that is based on the reference voltage VREF2. It is assumed, as illustrated in FIG. 5B, that the voltage corresponding to the voltage Vfb when the voltage V3 reaches the reference voltage VREF2 is a voltage Vfbd.

The oscillator signal output circuit 62 includes an operational amplifier 110, NMOS transistors 111, 116, 117, and 119, a resistor 112, PMOS transistors 113, 114, 115, and 118, a capacitor 120, and a hysteresis comparator 121.

The operational amplifier 110 adjusts a gate voltage V6 of the NMOS transistor 111 such that the lowest voltage out of the voltages V0, V2, and V4 applied to three non-inverting inputs thereof is equal to a voltage V5 at a node to which the inverting input thereof is coupled. As a result, assuming that the current flowing through the resistor 112 is a current I0, a voltage generated across the resistor 112 with the current I0 flowing through the resistor 112 results in the voltage V5.

The PMOS transistors 113 to 115 configure a current mirror circuit. The PMOS transistor 114 passes a current corresponding to the current I0 flowing through the PMOS transistor 113, and upon turning on of the PMOS transistor 118, the PMOS transistor 115 passes a current I1 corresponding to the current I0 flowing through the PMOS transistor 113.

The NMOS transistors 116 and 117 configure a current mirror circuit as well. The NMOS transistor 116 passes the current flowing through the PMOS transistor 114. Upon turning on of the NMOS transistor 119, the NMOS transistor 117 passes a current I2 corresponding to the current flowing through the PMOS transistor 114 and the NMOS transistor 116.

The PMOS transistor 118 and the NMOS transistor 119 are turned on and off according to a logical level of the oscillator signal Vosc. When the oscillator signal Vosc is low, the PMOS transistor 118 is turned on, and the capacitor 120 is charged with the current I1. Note that, at this time, the NMOS transistor 119 is turned off.

On the other hand, when the oscillator signal Vosc is high, the NMOS transistor 119 is turned on, and the capacitor 120 is discharged with the current I2. Note that, at this time, the PMOS transistor 118 is turned off.

The hysteresis comparator 121 compares the voltage across the capacitor 120 with a low threshold voltage Vthl or a high threshold voltage Vthh generated based on the reference voltage VREF4. When the voltage across the capacitor 120 is higher than the high threshold voltage Vthh, the hysteresis comparator 121 outputs a high oscillator signal Vosc. On the other hand, when the voltage across the capacitor 120 is lower than the low threshold voltage Vthl, the hysteresis comparator 121 outputs a low oscillator signal Vosc.

Hereinabove, a description has been given such that, when the signal ssend is high, the oscillator signal output circuit 62 outputs the oscillator signal Vosc with the frequency Fsw changing according to the voltage Vfb. As is apparent from the above-described circuit configuration of the oscillator signal output circuit 62, the operational amplifier 110 passes the larger current I0 through the resistor 112, as the voltage of the voltage V5, that is, the voltage value of the lowest voltage out of the voltages V0, V2, and V4, becomes higher. As a result, the currents I1 and I2 also becomes larger. As the currents I1 and I2 becomes larger, the capacitor 120 is charged or discharged faster, and thus the oscillator signal output circuit 62 outputs the oscillator signal Vosc with the higher oscillation frequency Fsw.

Figure 6A:
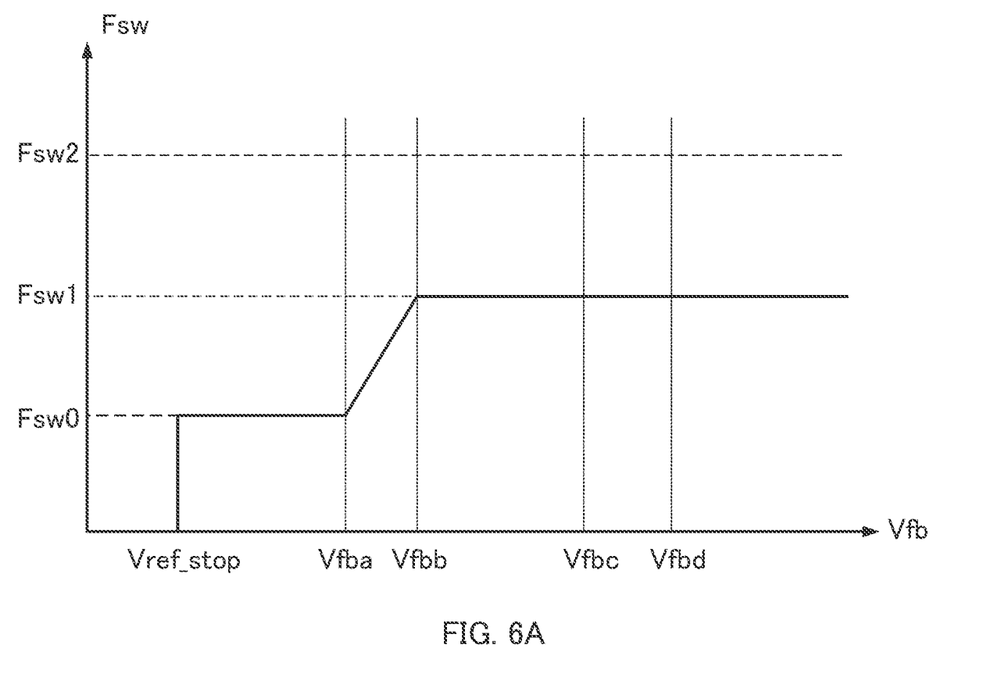
FIG. 6A is a chart illustrating change in frequency Fsw of a driving signal Vg in a soft start period.
Figure 6B:
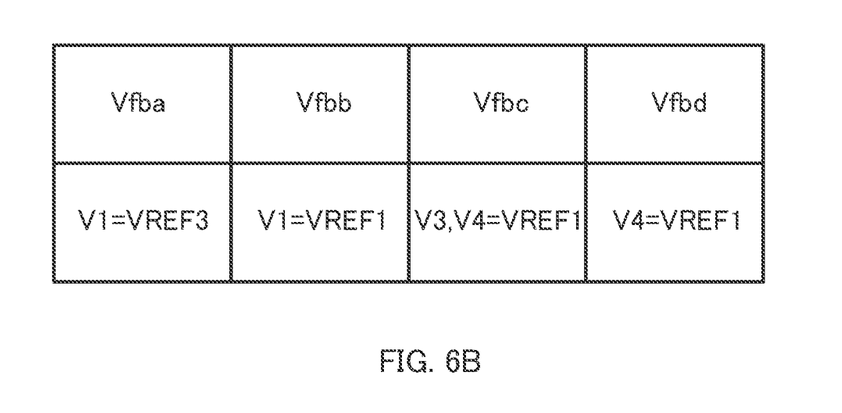
FIG. 6B is a chart illustrating a relationship between voltages V1, V3, and V4 and reference voltages VREF1 and VREF3 when a voltage Vfb reaches voltages Vfba to Vfbd.

As illustrated in FIG. 6A, when the signal ssend is low, the selection circuit 60 selects the reference voltage VREF1 even when the voltage Vfb reaches the voltage Vfbd. Thus, the oscillator signal output circuit 62 outputs the oscillator signal Vosc with the frequency Fsw1. Note that, as illustrated in FIG. 6B, the voltage V4 when the voltage of the voltage Vfb reaches the voltage Vfbc remains at the reference voltage VREF1. Thus, even when the voltage of the voltage Vfb reaches the voltage Vfbc, the operational amplifier 110 generates the current I0 according to the reference voltage VREF1 from the selection circuit 60.

When the signal ssend is low, the voltage V1 reaches the voltage VREF3 in response to the voltage of the voltage Vfb reaching the voltage Vfba, Thus, the oscillator signal output circuit 62 outputs the oscillator signal Vosc with the frequency Fsw0.

Note that the frequency Fsw1 corresponds to a "first frequency", the frequency Fsw2 corresponds to a "second frequency", and the frequency Fsw0 corresponds to a "third frequency". In addition, the range from the oscillation frequency Fsw1 to the oscillation frequency Fsw0 corresponds to a "first range", and the range from the oscillation frequency Fsw0 to the oscillation frequency Fsw2 corresponds to a "second range".

==Output Circuit 47==

Returning to FIG. 2, the output circuit 47 will be described. In response to the power supply voltage Vcc rising to the predetermined level Vccuvlo, the output circuit 47 outputs a voltage Vss that changes in stages. Specifically, in response to the undervoltage lockout circuit 41 outputting the signal rst to release the reset of the control IC 32, the output circuit 47 outputs the voltage Vss that rises in stages. In addition, in response to the timer 45 outputting the high signal ssend, the output circuit 47 causes the voltage Vss to be a voltage (e.g., a voltage Vdd) that is higher than at least the voltage Vfb_div. Note that the voltage Vss corresponds to a "sixth voltage".

==Driver Circuit 48==

The driver circuit 48 outputs a driving signal Vg in response to the oscillator signal Vosc. Specifically, the driver circuit 48 switches the power transistor 30 in response to the oscillator signal Vosc so as to gradually increase the on period of the power transistor 30 of FIG. 1 during the predetermined period P. On the other hand, the driver circuit 48 switches the power transistor 30 in response to the oscillator signal Vosc after the lapse of the predetermined period P.

The driver circuit 48 turns on the power transistor 30 in response to the oscillator signal Vosc. In addition, the driver circuit 48 turns off the power transistor 30, based on the voltage corresponding to the inductor current IL flowing through the power transistor 30 and the voltage to reduce the on period of the power transistor 30 out of the voltage Vfb and the voltage Vss.

Moreover, the driver circuit 48 switches the power transistor 30 in response to the oscillator signal Vosc with a frequency changing in the range from the oscillation frequency Fsw1 to the oscillation frequency Fsw0 during the predetermined period P. Furthermore, the driver circuit 48 switches the power transistor 30, based on the oscillator signal Vosc with a frequency changing in the range from the oscillation frequency Fsw0 to the oscillation frequency Fsw2, after the lapse of the predetermined period P.

The driver circuit 48 includes a one-shot circuit 50, an SR flip-flop 51, an OR circuit 52, a comparator 53, and a buffer 54.

===One-Shot Circuit 50===

The one-shot circuit 50 outputs a pulse signal Vp1 at the rising edge of the oscillator signal Vosc corresponding to the frequency Fsw of the oscillator signal Vosc.

===SR Flip-Flop 51===

When the one-shot circuit 50 outputs the pulse signal Vp1, the SR flip-flop 51 outputs a high signal Vd. On the other hand, in response to the comparator 53 outputting a high signal Vr, the SR flip-flop 51 outputs a low signal Vd.

===OR Circuit 52===

The OR circuit 52 calculates the logical sum of the pulse signal Vp1 and the signal Vd, and outputs a resultant signal as a signal Vq1. In other words, in response to the pulse signal Vp1 or the signal Vd going high, the OR circuit 52 outputs a high signal Vq1. On the other hand, in response to the pulse signal Vp1 and the signal Vd going low, the OR circuit 52 outputs a low signal Vq1.

===Comparator 53===

The comparator 53 compares the voltage Vcs at the time when the power transistor 30 is on with a lower voltage out of the voltage Vfb_div and the voltage Vss, and outputs the high signal Vr in response to the voltage Vcs exceeding the voltage Vfb_div or the voltage Vss. The comparator 53 outputs a low signal Vr in response to the voltage Vcs at the time when the power transistor 30 is on being lower than the voltage Vfb_div and the voltage Vss.

Note that the voltage Vcs may be inputted, as a voltage Vcs1, to the comparator 53 through a slope compensation circuit (not illustrated). In this case, the voltage Vcs1 is compared with a lower voltage out of the voltage Vfb_div and the voltage Vss, and in response to the voltage Vcs1 exceeding the voltage Vfb_div or the voltage Vss, the comparator 53 outputs the high signal Vr. On the other hand, in response to the voltage Vcs1 being lower than the voltage Vfb_div and the voltage Vss, the comparator 53 outputs the low signal Vr.

Accordingly, in response to the voltage Vcs exceeding the voltage Vfb_div or the voltage Vss and the comparator 53 outputting the high signal Vr, the SR flip-flop 51 outputs the low signal Vd. Thus, the power transistor 30 is turned off, in response to the voltage Vcs exceeding the voltage Vfb_div or the voltage Vss.

===Buffer 54===

The buffer 54 amplifies the signal Vq1 and outputs a resultant signal as the driving signal Vg. Specifically, in response to the OR circuit 52 outputting the high signal Vq1, the buffer 54 outputs the driving signal Vg to turn on the power transistor 30. On the other hand, in response to the OR circuit 52 outputting the low signal Vq1, the buffer 54 outputs the driving signal Vg to turn off the power transistor 30. Note that the inductor current IL corresponds to a "current flowing through the transistor".

===Comparator 49===

In response to the motor 11 of FIG. 1 entering a light load state and the output voltage Vout rising such that the voltage Vfb reaches a predetermined level, the comparator 49 causes the driver circuit 48 to stop switching the power transistor 30. Specifically, in response to the voltage Vfb dropping to a reference voltage Vref_stop, the comparator 49 outputs a signal stop to cause the driver circuit 48 to stop switching the power transistor 30. On the other hand, in response to the voltage Vfb being higher than the reference voltage Vref_stop, the comparator 49 outputs the signal stop to cause the driver circuit 48 to switch the power transistor 30. Note that the comparator 49 corresponds to a "stop circuit", and the reference voltage Vref_stop corresponds to a "second predetermined level".

<<<Change in Frequency Fsw in Normal Period>>>

FIG. 5A is a chart illustrating change in the frequency Fsw of the signal Vg in the normal period. FIG. 5B is a chart illustrating a relationship between the voltages V1 and V3 and the reference voltages VREF1 to VREF3 when the voltage Vfb reaches the voltages Vfba to Vfbd. As described above, when the signal ssend is high, the oscillator circuit 46 outputs the oscillator signal Vosc with the frequency Fsw corresponding to the voltage Vfb.

Specifically, when the voltage Vfb is lower than the voltage Vfba, that is, the voltage V1 is lower than the reference voltage VREF3, the frequency Fsw of the pulse signal Vp1 is the frequency Fsw0 that is based on the reference voltage VREF3. When the voltage Vfb further drops below the reference voltage Vref_stop, the comparator 49 outputs the signal stop to stop switching of the power transistor 30, and thus, the frequency Fsw of the driving signal Vg reaches 0 Hz.

In response to the voltage Vfb reaching the voltage Vfba, the voltage V1 reaches the reference voltage VREF3, and the frequency Fsw of the driving signal Vg reaches the frequency that is based on the voltage V1.

When the voltage Vfb is higher than the voltage Vfba but is lower than the voltage Vfbb and the voltage V1 is higher than the reference voltage VREF3 but is lower than the reference voltage VREF1, the frequency Fsw of the driving signal Vg increases in proportion to a rise in the voltage Vfb (i.e., a rise in the voltage V1).

In response to the voltage Vfb reaching the voltage Vfbb, the voltage V1 reaches the reference voltage VREF1, and the frequency Fsw of the driving signal Vg reaches the frequency Fsw1 that is based on the reference voltage VREF1.

When the voltage Vfb is higher than the voltage Vfbb but is lower than the voltage Vfbc and the voltage V3 is lower than the reference voltage VREF1, the frequency Fsw of the driving signal Vg reaches the frequency Fsw1 that is based on the reference voltage VREF1.

In response to the voltage Vfb reaching the voltage Vfbc, the voltage V3 reaches the reference voltage VREF1, and the frequency Fsw of the driving signal Vg results in the frequency Fsw1 that is based on the voltage V3.

When the voltage Vfb is higher than the voltage Vfbc but is lower than the voltage Vfbd and the voltage V3 is higher than the reference voltage VREF1 but is lower than the reference voltage VREF2, the frequency Fsw of the driving signal Vg increases in proportion to a rise in the voltage Vfb (i.e., a rise in the voltage V3).

In response to the voltage Vfb reaching the voltage Vfbd, the voltage V3 reaches the reference voltage VREF2, and the frequency Fsw of the driving signal Vg reaches the frequency Fsw2 that is based on the reference voltage VREF2.

Finally, in response to the voltage Vfb exceeding the voltage Vfbd and the voltage V3 exceeding the reference voltage VREF2, the frequency Fsw of the signal Vg results in the frequency Fsw2 that is based on the reference voltage VREF2.

<<<Change in Frequency Fsw in Soft Start Period>>>

FIG. 6A is a chart illustrating change in the frequency Fsw of the driving signal Vg in the soft start period. FIG. 6B is a chart illustrating a relationship between the voltages V1, V3, and V4 and the reference voltages VREF1 and VREF3 when the voltage Vfb reaches the voltages Vfba to Vfbd. As described above, the oscillator circuit 46 outputs the oscillator signal Vosc with the frequency Fsw corresponding to the voltage Vfb even when the signal ssend is low (i.e., the soft start period).

Specifically, change in the frequency Fsw of the driving signal Vg when the voltage Vfb reaches the voltage Vfbc from the reference voltage Vref_stop is similar to that when the signal ssend is high.

When the signal ssend is low, the selection circuit 60 of FIG. 3 selects the reference voltage VREF1 as the voltage V4. Thus, when the voltage Vfb is higher than the voltage Vfbc, the frequency Fsw of the driving signal Vg remains at the frequency Fsw1 that is based on the reference voltage VREF1, unlike the case where the signal ssend is high.

Accordingly, when the output voltage Vout is lower than the target level and the voltage Vfb is higher than the voltage Vfbc, the oscillation frequency Fsw in the soft start period results in the oscillation frequency Fsw1 as illustrated in FIG. 6A. Under the similar conditions, the oscillation frequency Fsw in the normal period is higher than the oscillation frequency Fsw1 as illustrated in FIG. 5A.

Thus, when the output voltage Vout is similar thereto, the frequency of the driving signal Vg outputted by the driver circuit 48 in the soft start period results in being lower than the frequency of the driving signal Vg in the normal period. As a result, the switching frequency of the power transistor 30 of FIG. 1 in the soft start period decreases, and the switching noise caused by the power transistor 30 also decreases.

However, when the motor 11 does not need much power in the normal period, the output voltage Vout may rise above the target level. In this case, as illustrated in FIG. 5A, the voltage Vfb may drop below the voltage Vfbb, and thus the frequency of the driving signal Vg in the soft start period is not always lower than the frequency of the driving signal Vg in the normal period.

<<<Operation of Control IC 32 in Normal Period>>>

Figure 7:
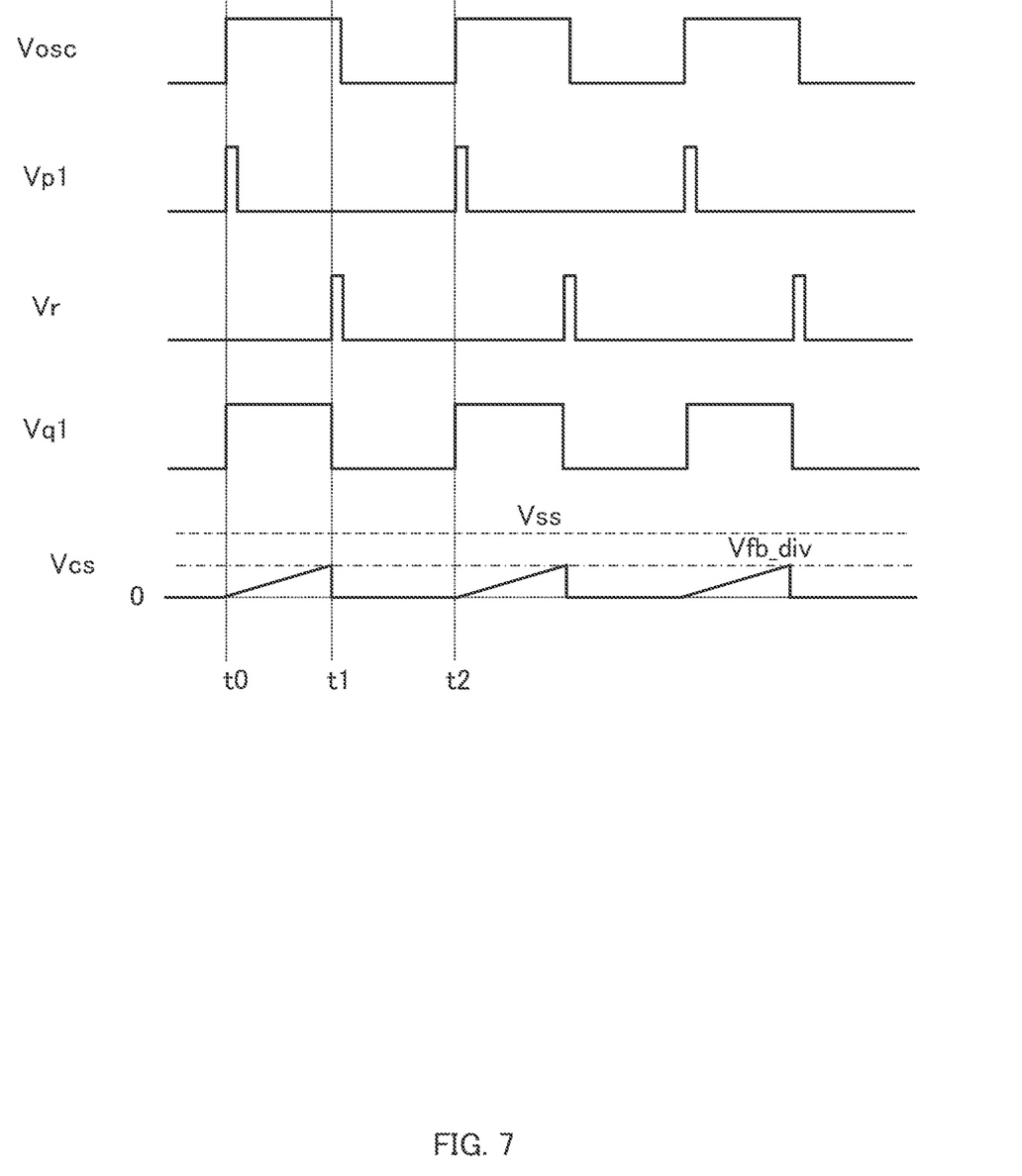
FIG. 7 is a chart illustrating an operation example of a control IC 32 in a normal period.

FIG. 7 is a chart illustrating an operation example of the control IC 32 in the normal period. It is assumed that the voltage Vfb is higher than the reference voltage Vref_stop, and the driver circuit 48 outputs the driving signal Vg to switch the power transistor 30.

At time t0, in response to the oscillator circuit 46 outputting the high oscillator signal Vosc, based on the frequency corresponding to the voltage Vfb, the one-shot circuit 50 outputs the signal Vp1. Then, upon receiving the signal Vp1, the OR circuit 52 outputs the high signal Vq1. The SR flip-flop 51 outputs the high signal Vd, upon receiving the signal Vp1.

Accordingly, the power transistor 30 is turned on, and the inductor current IL flows through the primary coil L1. Then, in response to the inductor current IL flowing through the power transistor 30, the voltage corresponding to the inductor current IL is generated at the resistor 31. Thereafter, the voltage generated across the resistor 31 rises with an increase in the inductor current IL, and thus the voltage Vcs gradually rises.

At time t1, at which the voltage Vcs rises to be equal to the voltage Vfb_div, the comparator 53 outputs the high signal Vr. Accordingly, the SR flip-flop 51 outputs the low signal Vd. Then, the OR circuit 52 outputs the low signal Vq1. Thus, the power transistor 30 is turned off. When the power transistor 30 is turned off, the inductor current IL does not flow through the primary coil L1. Note that the period of time from time t0 to time t1 is the on period of the power transistor 30.

From time t2, at which the oscillator circuit 46 outputs the high oscillator signal Vosc, the operation from time t0 to time t2 is repeated.

<<<Operation of Control IC 32 in Soft Start Period>>>

Figure 8:
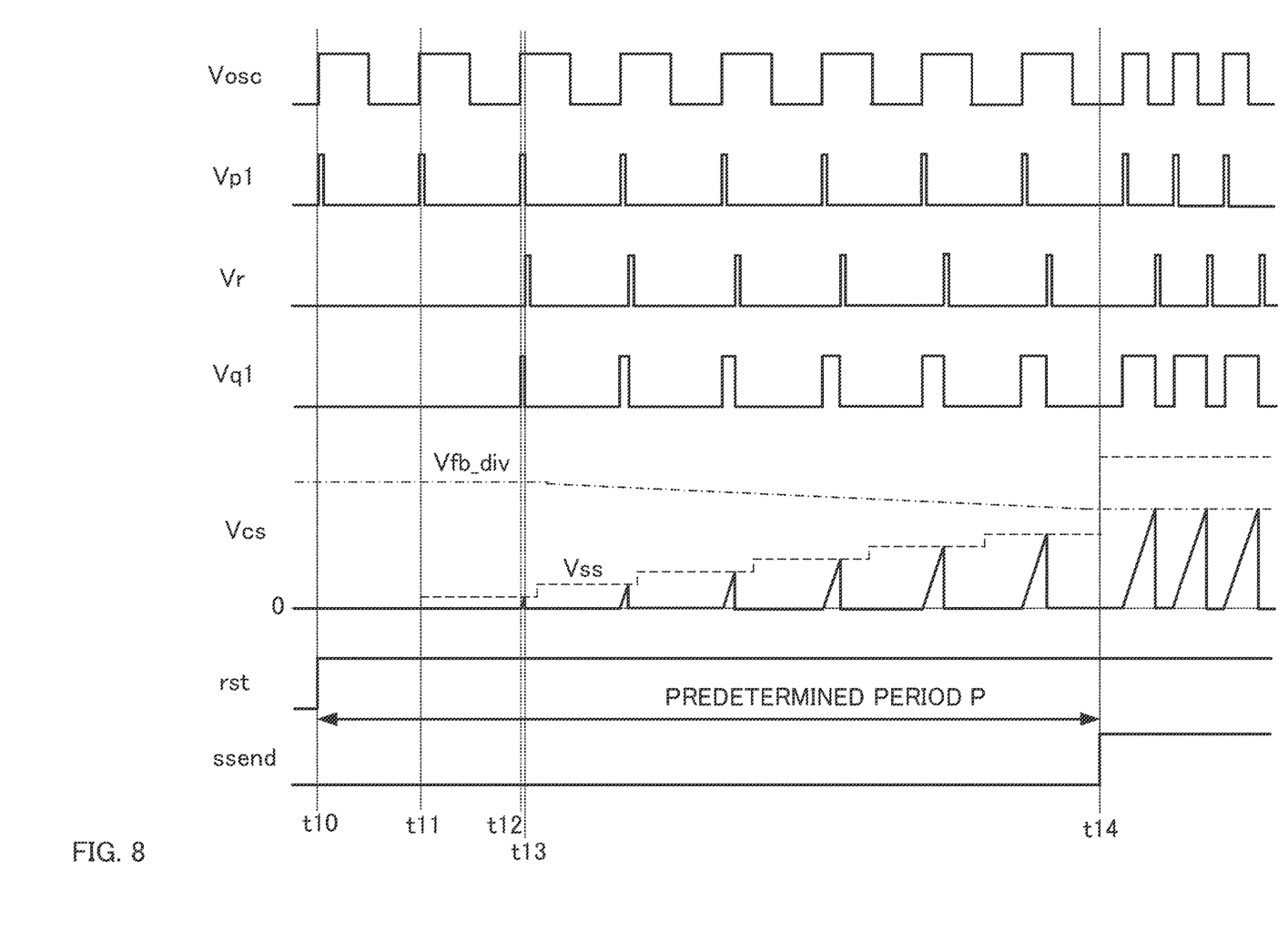
FIG. 8 is a chart illustrating an operation example of a control IC 32 in a soft start period.

FIG. 8 is a diagram illustrating an operation example of the control IC 32 in the soft start period. It is assumed that, before time t10, the voltage Vfb is higher than the voltage Vfbd, and the driver circuit 48 outputs the driving signal Vg to switch the power transistor 30.

With the startup circuit 40 charging the capacitor 37 of FIG. 1, the undervoltage lockout circuit 41 outputs the (high) signal rst to release the reset of the control IC 32 at time t10, at which the power supply voltage Vcc reaches the predetermined level Vccuvlo.

In response to the undervoltage lockout circuit 41 outputting the high signal rst, the timer 45 outputs the low signal ssend. In response to the timer 45 outputting the low signal ssend, the selection circuit 60 selects the reference voltage VREF1 as the voltage V4.

In this case, as illustrated in FIG. 6B, the oscillation frequency of the oscillator signal Vosc results in the frequency Fsw1. Then, in response to the undervoltage lockout circuit 41 outputting the high signal rst, the output circuit 47 outputs the voltage Vss that rises from the ground voltage in stages.

At time t11, the output circuit 47 raises the voltage Vss from the ground voltage.

At time t12, at which the oscillator signal Vosc goes high, the one-shot circuit 50 outputs the signal Vp1. In response to the signal Vp1 being outputted therefrom, the driver circuit 48 causes the driving signal Vg to go high. This causes the power transistor 30 of FIG. 1 to be turned on.

At time t13, at which the voltage Vcs reaches the voltage Vss with turning on of the power transistor 30, the comparator 53 outputs the high signal Vr since the voltage Vss is lower than the voltage Vfb_div. In response to the signal Vr going high, the SR flip-flop 51 outputs the low signal Vd. In response to the low signal Vd being outputted therefrom, the driver circuit 48 outputs the low driving signal Vg. This turns off the power transistor 30 of FIG. 1.

Thereafter, the operation from time t12 to time t13 is repeated until time t14, at which the timer 45 outputs the high signal ssend because the predetermined period P has elapsed from when the undervoltage lockout circuit 41 outputs the high signal rst. In addition, because the output circuit 47 outputs the voltage Vss that rises in stages, the on period of the power transistor 30 gradually increases from time t12 to time t14.

At time t14, in response to the soft start period (i.e., the predetermined period P) having elapsed and the timer 45 outputting the high signal ssend, the selection circuit 60 selects the reference voltage VREF2 as the voltage V4. In this case, when the output voltage Vout is lower than the target level, the oscillation frequency of the oscillator signal Vosc reaches the frequency Fsw2 as illustrated in FIG. 5B.

In addition, upon receiving the high signal ssend, the output circuit 47 causes the voltage Vss to be a voltage (e.g., the voltage Vdd) higher than the voltage Vfb_div. Accordingly, the voltage Vfb_div becomes lower than the voltage Vss, and thus from time t14, the control IC 32 operates as illustrated in FIG. 7.

===Modifications===

Figure 9:
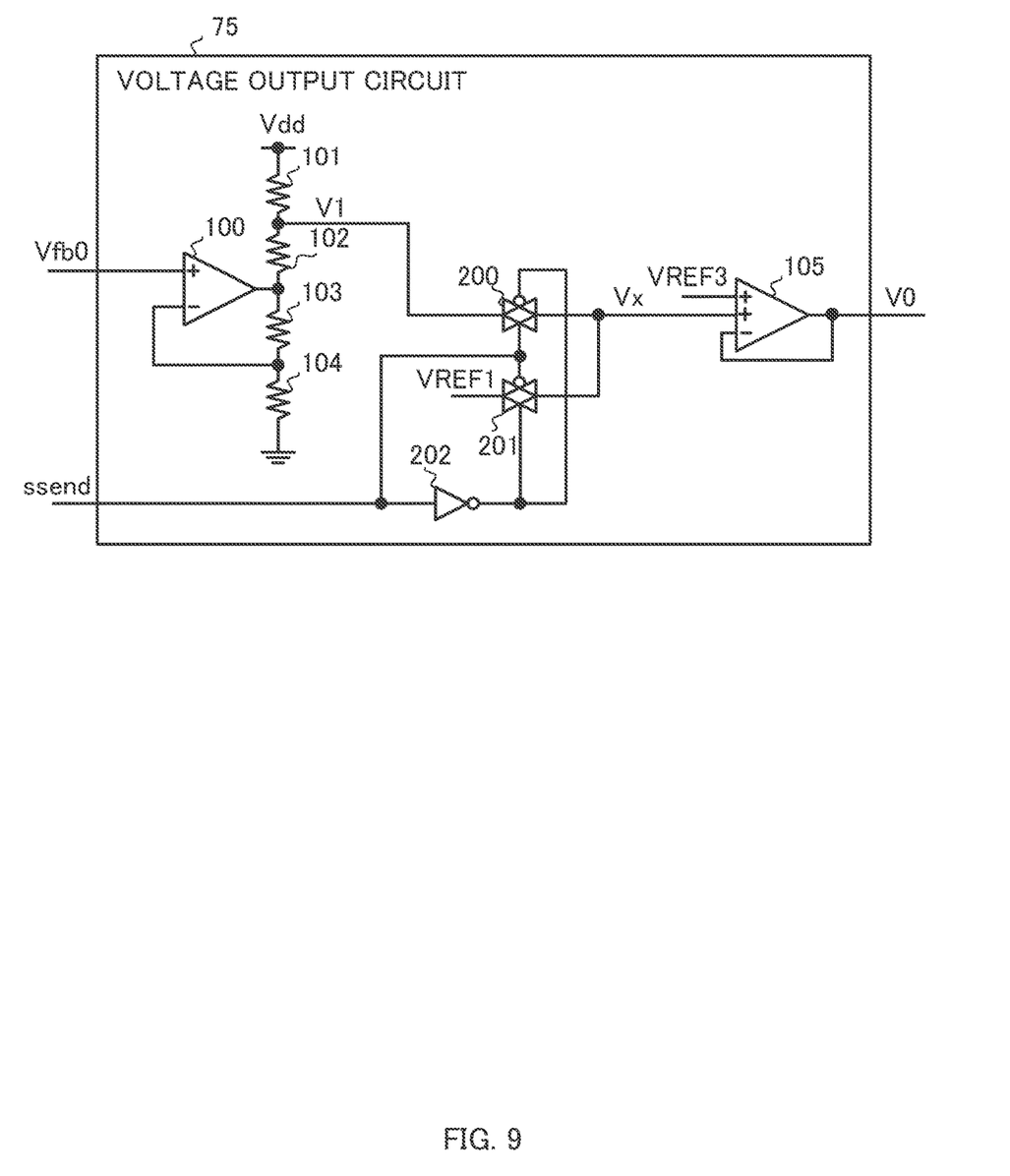
FIG. 9 is a diagram illustrating a configuration example of a voltage output circuit 75.

FIG. 9 is a diagram illustrating a configuration example of a voltage output circuit 75. The voltage output circuit 75 is a modification of the voltage output circuit 72. In response to the timer 45 outputting the low signal ssend (i.e., during the predetermined period P), the voltage output circuit 75 outputs the reference voltage VREF1 as the voltage V0, even when the voltage Vfb becomes equal to or lower than the voltage Vfbb of FIG. 6A.

The voltage output circuit 75 includes the operational amplifiers 100 and 105, the resistors 101 to 104, analog switches 200 and 201, and an inverter 202. Note that parts or elements that are similar to those of the voltage output circuit 72 are given the same reference signs. Accordingly, the following describes operations of the analog switches 200 and 201 and the inverter as different points.

In response to the signal ssend from the timer 45, the analog switches 200 and 201 output the voltage V1 or the reference voltage VREF1 as a voltage Vx. Specifically, in response to the signal ssend being high and an output of the inverter 202 goes low, the analog switch 200 is turned on, and the voltage Vx results in the voltage V1. In response to the signal ssend being low, the analog switch 200 is turned off.

On the other hand, when the signal ssend is low and the output of the inverter 202 goes high, the analog switch 201 is turned on, and the voltage Vx reaches the reference voltage VREF1. Further, when the signal ssend is high, the analog switch 201 is turned off.

Then, the operational amplifier 105 outputs, as the voltage V0, a voltage to increase the oscillation frequency Fsw of the oscillator signal Vosc, out of the reference voltage VREF3 and the voltage Vx. When the signal ssend is high, the voltage output circuit 75 operates similarly to the voltage output circuit 72. On the other hand, when the signal ssend is low, the voltage output circuit 75 outputs the reference voltage VREF1 as the voltage V0 because the reference voltage VREF1 is higher than the reference voltage VREF3.

As described above, in a case where the voltage output circuit 75 is used instead of the voltage output circuit 72, and when the timer 45 outputs the low signal ssend, the oscillator circuit 46 outputs the oscillator signal Vosc with the frequency Fsw1.

===Summary===

The AC-DC converter 10 according to an embodiment of the present disclosure has been described above. The control IC 32 includes the timer 45, the oscillator circuit 46, and the driver circuit 48. The oscillator circuit 46 outputs the oscillator signal Vosc with the oscillation frequency Fsw1 before the lapse of the predetermined period P (i.e., in the soft start period). When the AC-DC converter 10 is started up, the output voltage Vout is lower than the target level, and thus the voltage Vfb is high. In addition, the oscillation frequency Fsw1 is lower than the oscillation frequency Fsw2 of the oscillator signal Vosc at a time when the voltage Vfb is similarly high after the lapse of the predetermined period P (i.e., in the normal period). Thus, the switching frequency of the power transistor 30 when the AC-DC converter 10 is started up is lower than the switching frequency in the normal period when the output voltage Vout is the same. This makes it possible to provide an integrated circuit that reduces the switching noise of the transistor when the AC-DC converter is started up.

The oscillator circuit 46 includes the selection circuit 60, the adjustment circuit 61, and the oscillator signal output circuit 62. The selection circuit 60 selects the reference voltage VREF1 corresponding to the oscillation frequency Fsw1 as the voltage V4, before the lapse of the predetermined period P, and selects the reference voltage VREF2 corresponding to the oscillation frequency Fsw2 as the voltage V4, after the lapse of the predetermined period P. This makes it possible that the oscillator circuit 46 outputs the oscillator signal Vosc with the oscillation frequency Fsw lower than that in the normal period when the output voltage Vout is lower than the target level, before the lapse of the predetermined period P, using a simple circuit.

The adjustment circuit 61 includes the voltage output circuits 71 and 72. With the adjustment circuit 61 including the voltage output circuits 71 and 72, the oscillator circuit 46 can change the oscillation frequency Fsw as illustrated in FIG. 5A according to a change in the voltage Vfb.

The control IC 32 includes the comparator 49. In response to the voltage Vfb reaching the reference voltage Vref_stop, in other words, the output voltage Vout rising above the target level, the comparator 49 stops switching of the power transistor 30. This makes it possible that the control IC 32 suppresses further rising of the output voltage Vout.

The control IC 32 includes the output circuit 47. In response to the power supply voltage Vcc reaching the predetermined level Vccuvlo, the output circuit 47 outputs the voltage Vss that changes (i.e., rises) in stages. This makes it possible for the control IC 32 to gradually raise the output voltage Vout when the AC-DC converter 10 is started up.

The present disclosure is directed to provision of an integrated circuit that reduces switching noise of a transistor when an AC-DC converter is started up.

According to the present disclosure, it is possible to provide an integrated circuit that reduces switching noise of a transistor when an AC-DC converter is started up.

Embodiment(s) and modifications of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit configured to generate an output voltage of a target level from an input voltage thereof, the power supply circuit including a coil and a transistor configured to control a current flowing through the coil, the integrated circuit being configured to drive the transistor, the integrated circuit comprising:
   a determination circuit configured to determine whether a predetermined time period has elapsed since a power supply voltage of the integrated circuit rises to a first predetermined level;
   an oscillator circuit configured to output an oscillator signal, the oscillator signal
      having a first frequency before lapse of the predetermined time period, and
      changing in a range at least from the first frequency to a second frequency higher than the first frequency, based on the output voltage, after the lapse of the predetermined time period; and
   a driver circuit configured to switch the transistor responsive to the oscillator signal, so as to gradually increase an on period of the transistor, in the predetermined time period, and switch the transistor responsive to the oscillator signal, after the lapse of the predetermined time period.

2. The integrated circuit according to claim 1, wherein the oscillator circuit includes
   a selection circuit configured to
      select a first voltage corresponding to the first frequency as a selected voltage, before the lapse of the predetermined time period, and
      select a second voltage corresponding to the second frequency as the selected voltage, after the lapse of the predetermined time period,
   an adjustment circuit configured to output a voltage to adjust a frequency of the oscillator signal, based on a feedback voltage corresponding to the output voltage, and
   an oscillator signal output circuit configured to output the oscillator signal, and to reduce the frequency of the oscillator signal based on one of the voltage from the adjustment circuit and the selected voltage.

3. The integrated circuit according to claim 2, wherein the adjustment circuit includes
   a first voltage output circuit configured to output, as a first adjustment voltage, the first voltage corresponding to the first frequency or a third voltage corresponding to the feedback voltage, for increasing the frequency of the oscillator signal, and
a second voltage output circuit configured to output, as a second adjustment voltage, a fourth voltage corresponding to a third frequency lower than the first frequency or a fifth voltage corresponding to the feedback voltage, for increasing the frequency of the oscillator signal, and
the oscillator signal output circuit reduces the frequency of the oscillator signal based on the selected voltage, the first adjustment voltage, or the second adjustment voltage.

4. The integrated circuit according to claim 2, further comprising:
a stop circuit configured to cause the driver circuit to stop switching the transistor, responsive to the feedback voltage reaching a second predetermined level.

5. The integrated circuit according to claim 2, further comprising:
an output circuit configured to output a sixth voltage that changes in stages, responsive to the power supply voltage rising to the first predetermined level, wherein the driver circuit
turns on the transistor responsive to the oscillator signal, and
turns off the transistor, based on
a voltage corresponding to a current flowing through the transistor, and
a voltage to reduce the on period of the transistor out of the feedback voltage and the sixth voltage.

6. An integrated circuit for a power supply circuit configured to generate an output voltage of a target level from an input voltage thereof, the power supply circuit including a coil and a transistor configured to control a current flowing through the coil, the integrated circuit being configured to drive the transistor, the integrated circuit comprising:
a determination circuit configured to determine whether a predetermined time period has elapsed since a power supply voltage of the integrated circuit rises to a first predetermined level;
an oscillator circuit configured to output an oscillator signal, the oscillator signal
having a first frequency, a second frequency higher than the first frequency, and a third frequency lower than the first frequency,
changing in a first range from the first frequency to the third frequency based on the output voltage, before lapse of the predetermined time period, and
changing in a second range from the third frequency to the second frequency based on the output voltage, after the lapse of the predetermined time period; and
a driver circuit configured to
switch the transistor responsive to the oscillator signal that changes in the first range, in the predetermined time period, and
switch the transistor responsive to the oscillator signal that changes in the second range, after the lapse of the predetermined time period.

7. A power supply circuit configured to generate an output voltage of a target level from an input voltage thereof, the power supply circuit comprising:
a coil;
a transistor configured to control a current flowing through the coil; and
an integrated circuit configured to drive the transistor, the integrated circuit including
a determination circuit configured to determine whether a predetermined time period has elapsed since a power supply voltage of the integrated circuit rises to a first predetermined level,
an oscillator circuit configured to output an oscillator signal, the oscillator signal
having a first frequency, before lapse of the predetermined time period, and
changing in a range at least from the first frequency to a second frequency higher than the first frequency, based on the output voltage, after the lapse of the predetermined time period, and
a driver circuit configured to switch the transistor responsive to the oscillator signal, so as to gradually increase an on period of the transistor, in the predetermined time period, and switch the transistor responsive to the oscillator signal, after the lapse of the predetermined time period.

* * * * *